(12) United States Patent
Boge et al.

(10) Patent No.: US 8,883,882 B2
(45) Date of Patent: Nov. 11, 2014

(54) NON-AQUEOUS DISPERSION OF POLYMER PARTICLES IN REACTIVE DILUENT

(75) Inventors: Nicolas Boge, Hamburg (DE); Torsten Stachelhaus, Hamburg (DE); Andreas Kreipl, Hamburg (DE); Dalibor Vukadlnovic-Tenter, Hamburg (DE); Klaus-Uwe Koch, Recklinghausen (DE); Daniel Junghans, Herten (DE); Angela Kaufmann, Essen (DE); Nicole Jagielski, Falkensee (DE); Judith Schmidt, Selm-Cappenberg (DE)

(73) Assignee: Dritte Patentportfolio Beteiligungygesellschaft MbH & Co. KG, Waltersdorf (DE)

( * ) Notice: Subject to any disclaimer, the term of this patent is extended or adjusted under 35 U.S.C. 154(b) by 249 days.

(21) Appl. No.: 13/320,162

(22) PCT Filed: Mar. 31, 2010

(86) PCT No.: PCT/EP2010/002082
§ 371 (c)(1),
(2), (4) Date: Mar. 5, 2012

(87) PCT Pub. No.: WO2010/130321
PCT Pub. Date: Nov. 18, 2010

(65) Prior Publication Data
US 2012/0149832 A1    Jun. 14, 2012

(30) Foreign Application Priority Data
May 11, 2009  (DE) .......................... 10 2009 020 638

(51) Int. Cl.
| | |
|---|---|
| *B01F 3/08* | (2006.01) |
| *C08L 63/00* | (2006.01) |
| *C08L 75/02* | (2006.01) |
| *C08L 77/02* | (2006.01) |
| *C08L 83/04* | (2006.01) |
| *C08L 75/04* | (2006.01) |
| *C08G 18/32* | (2006.01) |
| *C08G 18/48* | (2006.01) |
| *C08L 33/06* | (2006.01) |

(52) U.S. Cl.
CPC ............. *C08G 18/4825* (2013.01); *C08L 33/06* (2013.01); *C08L 75/04* (2013.01); *C08L 83/04* (2013.01); *C08L 63/00* (2013.01); *C08L 77/02* (2013.01); *C08G 18/3228* (2013.01); *C08L 75/02* (2013.01); *Y10S 977/779* (2013.01)

USPC ........... 523/322; 524/538; 524/593; 524/588; 524/555; 525/55; 977/779

(58) Field of Classification Search
USPC ....................... 523/322; 524/538, 593; 525/55
See application file for complete search history.

(56) References Cited

U.S. PATENT DOCUMENTS

| | | | | |
|---|---|---|---|---|
| 5,700,882 | A * | 12/1997 | Jones et al. ............... | 525/440.04 |
| 6,555,228 | B2 * | 4/2003 | Guritza ......................... | 428/414 |
| 6,673,874 | B1 * | 1/2004 | Choudhery ................... | 525/425 |
| 8,288,485 | B2 | 10/2012 | Koch et al. | |
| 2008/0182946 | A1 * | 7/2008 | Dorr et al. ..................... | 525/452 |
| 2009/0118438 | A1 | 5/2009 | Koch et al. | |

FOREIGN PATENT DOCUMENTS

| | | |
|---|---|---|
| EP | 1910436 | 4/2008 |
| JP | 0860130 | 3/1996 |
| JP | 11315138 | 11/1999 |
| JP | 2009503159 | 1/2009 |

OTHER PUBLICATIONS

Machine translated JP 1996-60130, Mar. 1996.*
Chinese Office Action for Chinese Patent Application No. 201080021058.4, dated Mar. 19, 2013, 12 pages.
English Translation of Chinese Office Action for Chinese Patent Application No. 201080021058.4, dated Mar. 19, 2013, 11 pages.

(Continued)

*Primary Examiner* — Tae H Yoon
(74) *Attorney, Agent, or Firm* — Morgan, Lewis & Bockius, LLP

(57) ABSTRACT

The invention relates to a non-aqueous dispersion of organic polymer particles in a reactive diluent. Said non-aqueous dispersion can be obtained in that at least one monomer is polymerized in the reactive diluent, forming the organic polymer particles, wherein the reactive diluent does not participate in said polymerization due to the orthogonal reactivity thereof relative to the monomers, but comprises a functionality allowing later targeted polymerization. Depending on the organic polymer particles or reactive diluents used, the non-aqueous dispersion can be used in multifaceted applications having a wide range of application profiles. In order to produce said non-aqueous dispersion, polymerization of at least one monomer in a stirred tank reactor in the presence of a reactive diluent is particularly suitable, wherein the conversion is performed at a stirring speed of at least 2 m/s, wherein the ratio of the stirrer diameter to the vessel diameter is set to 0.3-0.80 and the distance from the stirrer to the vessel floor is set to 0.25 to 0.5 times the stirrer diameter. The invention provides multifaceted advantageous applications, particularly as an impact strength modifier, particularly in films, and as an adhesive, as casting resin, or as paint. A particularly advantageous application is producing a molded part or a semi-finished polymer product.

15 Claims, No Drawings

(56) References Cited

OTHER PUBLICATIONS

Rutz Daniel, "Impact Modifier for Adhesives", Non-aqueous dispersions of polyurethanes in esters; Apr. 23, 2004, Recklinghausen, Germany; Machine translation into English of (Rutz D: "Impact Modifier fur Klebstoffe-Nicht wassrige Dispersionen von Polyurethanen in Estern-"Diplomarbeit an Der Fachhochschule Gelsenkirchen, XX, XX, Apr. 23, 2004, Seite Complete, XP002403838.

Machine translation into English of WO2007/012412, a family member of EP1910436 which was cited in the International Search Report for PCT/EP2010/002082, 24 pages, Apr. 2008.

The International Search Report for PCT/EP2010/002082, dated May 4, 2011, 6 pages.

English translation of Notice of Reasons for Rejection issued in Japanese Patent Application No. 2012-510125, dated Jul. 4, 2013, 3 pages.

Notice of Reasons for Rejection issued in Japanese Patent Application No. 2012-510125, dated Jul. 4, 2013, 3 pages.

Machine translation of German counterpart of European Patent Application No. EP1910436 (DE102005035235, Apr. 2008.

German Office Action for German Patent Application No. 102009020638.8, dated Sep. 27, 2012, 8 pages.

* cited by examiner

NON-AQUEOUS DISPERSION OF POLYMER PARTICLES IN REACTIVE DILUENT

CROSS-REFERENCE TO RELATED APPLICATIONS

This application is a National Stage Application of International Application No. PCT/EP2010/002082, filed on Mar. 31, 2010, which claims priority benefit from DE 102009020638.8 filed May 11, 2009, each of which are incorporated herein by reference in their entirety.

The invention relates to a non-aqueous dispersion of organic polymer particles in a reactive diluent, a method for its production and its use.

Non-aqueous dispersions of organic polymer particles in a reactive diluent are described in the prior art. Reference is to be made here, especially, to EP 1 910 436 B1 in conjunction with the present invention. Specifically claimed therein is a non-aqueous transparent dispersion of polyurethane(meth)acrylate particles in a reactive diluent. This non-aqueous transparent dispersion is obtainable in that a polyisocyanate is converted with at least one polyol and a nucleophilically functionalised (meth)acrylic acid ester in a reactive diluent. A particular characteristic of this non-aqueous transparent dispersion is the mean diameter of the polyurethane(meth)acrylate particles at less than 40 nm.

An advantageous method for producing the described non-aqueous transparent dispersion of polyurethane(meth)acrylate particles is also described in EP 1 910 436 B1. A polyisocyanate with at least one polyol and a nucleophilically functionalised (meth)acrylic acid ester is converted here in a reactive diluent. The conversion takes place in a stirred tank reactor. It is important here for the conversion to be carried out at a peripheral stirrer speed of at least 5 m/s, the ratio of stirrer diameter to vessel diameter being 0.3 to 0.8 and the distance of the stirrer from the vessel base being 0.25 to 0.5 times the stirrer diameter.

Advantageous uses of the designated dispersion are also disclosed, such as a dispersion adhesive or as a component thereof or as a cast glass or as a component thereof. Moreover, an advantageous use of this dispersion is to comprise in that it is to be used as an impact strength-improving agent in moulding compounds, adhesives or cast glasses. Furthermore, a moulded body, obtainable by hardening the above-designated dispersion, is described in EP 1 910 436 B1.

The above-described known teaching is, especially, based on a need for adhesive systems, by means of which a completely transparent adhesive connection can be achieved. This is to be significant, especially, in the adhesion of glass, in which the transparency is also to be retained in the end product. It proves to be equally important that the hardened adhesive has minimum impact strength in order to obtain a mechanically loadable adhesive connection. Furthermore, the provision of a non-aqueous dispersion, obtainable from relatively few components, proved to be an object of the known teaching to thus make production more economical. Finally, it is an aim according to the described prior art that the designated dispersion should contain a high solid content of polyurethane in order to optimise the impact strength properties. However, at the same time, good handleability and processability of the dispersion aimed for should be provided.

The solution to this aim is found in the non-aqueous transparent dispersion already described above of polyurethane (meth)acrylate particles in a reactive diluent taking into account the designated production measures and the mean diameter of the disclosed polyurethane(meth)acrylate particles of less than 40 nm. The above-described prior art, as can be seen, leads to knowledge which proves to be advantageous in the use of the described non-aqueous dispersion of polyurethane(meth)acrylate particles, for example as adhesive, cast glass or an impact strength modifier. However, as can easily be seen, the described teaching is very specific and restricted to special polyacrylate particles. However, the disclosure of EP 1 910 436 B1 gives no indications that an advantageous generalisation would be possible here in any way.

The invention was therefore based on the object, proceeding from the above-described prior art, of generalising this such that diverse organic polymer particles can be used in the form of non-aqueous dispersions in a reactive diluent, the latter, especially, with regard to equally diverse applications with the requirements placed there.

According to the invention, the designated aim is addressed by a non-aqueous dispersion of organic polymer particles in a reactive diluent, which is obtainable in that at least one monomer is polymerised in the reactive diluent, forming the organic polymer particles, wherein the reactive diluent does not participate in this polymerisation due to its orthogonal reactivity relative to the monomers, but has a functionality allowing later targeted polymerisation. Accordingly, the polymerisation can be carried out virtually in a "controlled" manner.

The central recognition of the inventors accordingly is that at least one monomer, optionally in the presence of a further monomer which is different therefrom, is polymerised in the reactive diluent, forming organic polymer or copolymer particles. The reactive diluent in the process fulfils the following functions: the reactive diluent is used as a liquid reaction medium for the reaction of the starting monomers and the like, which are used in the production of the non-aqueous dispersion according to the invention. It does not participate in the polymer formation reaction. However, it is also a solvent for further added monomers and comonomers, which, for example, are retrospectively attached to the polymer particles and are preferably nucleophilically functionalised for this purpose. This optional procedure will be described in more detail below or emerges from claim 5. The reactive diluent, on conclusion of the polymerisation to form the organic polymer particles, is the liquid dispersant for the formed organic polymer particles. In addition, the reactive diluent in a further step, as already mentioned, can be hardened by polymerisation, the previously formed organic polymer particles being embedded in the hardened reactive diluent at the end of this reaction. For this purpose, the reactive diluent contains a functionality, the reactivity of which is orthogonal to that of the monomers being formed into the particles. The feature "orthogonal reactivity" is consequently to be understood such that during the polymerisation of the polymer particles, the growing polymer chains cannot react with the reactive diluent.

The selection of a suitable reactive diluent is possible without problems for the person skilled in the art taking into account the aforementioned conditions. By means of polymerisation of the reactive diluent, as mentioned above, the organic particles are irreversibly embedded in the reactive diluent. The product obtained in this manner can also be designated a "hardened dispersion".

This polymerisation can take place in the case of application with predetermined reaction partners, for example forming an adhesive connection using suitable catalysts. Moreover, there is also the possibility of modifying the organic polymer particles obtained during the designated polymerisation in such a way that they carry a further monomer that can react with the reactive diluent during polymerisation. The total system can be adjusted in such a way that the reactive diluent can react with the thus functionalised organic polymer particles. The reaction can take place, for example, by heating, irradiation, for example with UV or infrared light, and/or by the introduction of a suitable catalyst or hardening agent.

The above-described functionalisation of the surface of the polymer particles can contribute to the stabilisation of the dispersions but it is not in any way essential for the formation of stable dispersions.

The invention consequently comprises an unusually advantageous generalisation of the above-described prior art and proves to be particularly advantageous with regard to the extended application range mentioned. This is to be described in detail below:

In a modification A of the present invention, it has proven to be advantageous if the at least one monomer has been polymerised to form the organic polymer particles with the aid of a stage growth mechanism, especially an addition or condensation mechanism. These terms are familiar to the person skilled in the art without restriction.

When selecting the monomer or monomers to form the organic polymer particles, the invention is not subject to any important restrictions. However, it is preferred for the monomer or monomers to be targeted combinations of compounds selected from the group consisting of carboxylic acids or derivatives thereof and amines, epoxides and diols, urea derivatives and aldehydes, alkyl polysilicates and disiloxanes, phosgene and diols, dialkoxyaryl derivatives and aryl diols, or 1,4-dichlorobenzene and sodium sulphide. The person skilled in the art can easily infer from this list of combinations given by way of example that these react accordingly during a polymerisation, forming polyamides or polyimides, epoxy resins, urea resins, silicone resins, polycarbonates, polyaryletherketones and polyphenylene sulphides.

The reactive diluent is particularly important in the framework of the invention, as shown above. It is advantageous if the latter, when applying the above-mentioned modification A, is present in the form of one or more olefinically mono- or polyunsaturated monomers. In order to convey a certain impression in this regard, preferred examples are given in the following list A: alkyl(meth)acrylates, which are derived from saturated alcohols, such as methyl(meth)acrylate, ethyl (meth)acrylate, isopropyl(meth)acrylate, n-propyl(meth)acrylate, butyl(meth)acrylate, pentyl(meth)acrylate, n-hexyl (meth)acrylate, n-octyl(meth)acrylate, n-decyl(meth) acrylate, isooctyl(meth)acrylate, 2-ethylhexyl(meth) acrylate, tetradecyl(meth)acrylate etc.; alkyl(meth)acrylates, which are derived from unsaturated alcohols, such as for example oleyl(meth)acrylate, 2-propinyl(meth)acrylate, allyl (meth)acrylate, vinyl(meth)acrylate etc.; amides and nitriles of (meth)acryl acid, such as N-(3-dimethylaminopropyl) (meth)acrylamide, N-(diethylphosphono)(meth)acrylamide, N-(3-dibutylaminopropyl)(meth)acrylamide, N-t-butyl-N-(diethylphosphono)(meth)acrylamide, N,N-bis(2-diethylaminoethyl)(meth)acrylamide, (meth)acryloylamidoacetonitrile, N-(methoxymethyl)(meth)acrylamide, N-acetyl (meth)acrylamide, N-(dimethylaminoethyl)(meth) acrylamide, N-methyl-N-phenyl(meth)acrylamide, N,N-diethyl(meth)acrylamide, N-methyl(meth)acrylamide, N,N-dimethyl(meth)acrylamide, N-isopropyl(meth)acrylamide; aminoalkyl(meth)acrylates, such as tris(2-(meth)acryloxyethyl)amine, n-methylformamidoethyl(meth)acrylate, 3-diethylaminopropyl(meth)acrylate, 2-ureidoethyl(meth)acrylate; other nitrogen-containing (meth)acrylates, such as N-((meth)acryloxyethyl)diisobutylketimine, 2-(meth) acryloyloxyethylmethylcyanamide, cyano-methyl(meth) acrylate, 2,2,6,6-tetramethylpiperidyl(meth)acrylate; aryl (meth)acrylates, such as nonylphenyl(meth)acrylate, benzyl (meth)acrylate, 2-naphthyl(meth)acrylate, phenyl(meth) acrylate, wherein the aryl groups may in each case be unsubstituted or substituted up to four times; carbonyl-containing(meth)acrylates, such as 2-carboxyethyl(meth)acrylate, carboxymethyl(meth)acrylate, N-(2-(meth)acryloyloxyethyl-2-pyrrolidinone, N-(3-(meth)acryloyloxypropyl)-2-pyrrolidinone, N-(meth)acryloylmorpholine, oxazolidinylethyl(meth)acrylate, N-((meth)acryloyloxy)formamide, acetonyl(meth)acrylate, N-(meth)acryloyl-2-pyrrolidone; cycloalkyl(meth)acrylate, such as cyclobutyl(meth)acrylate cyclopentyl(meth)acrylate, cyclohexyl(meth) acrylate, cyclooctyl(meth)acrylate, 3-vinylcyclohexyl(meth) acrylate, 3,3,5-trimethylcyclohexyl(meth)acrylate, bornyl (meth)acrylate, cyclopenta-2,4-dienyl(meth)acrylate, isobornyl(meth)acrylate, 1-methylcyclo-hexyl(meth)acrylate; glycoldi(meth)acrylates, such as 1,4-butanedioldi(meth) acrylate, 1,3-butanedioldi(meth)acrylate, triethyleneglycoldi (meth)acrylate, 2,5-dimethyl1,6-hexanedioldi(meth) acrylate, 1,10-decanedioldi(meth)acrylate, 1,2-propanedioldi(meth)acrylate, diethyleneglycoldi(meth) acrylate, ethyleneglycoldi(meth)acrylate; (meth)acrylates from ether alcohols, such as tetrahydrofurfuryl(meth)acrylate, vinyloxyethoxyethyl(meth)acrylate, methoxyethoxyethyl(meth)acrylate, 1-butoxypropyl(meth)acrylate, 1-methyl-(2-vinyloxy)ethyl(meth)acrylate, cyclohexyloxymethyl (meth)acrylate, methoxymethoxyethyl(meth)acrylate, benzyloxymethyl(meth)acrylate, phenyloxyethylmethacrylate, furfuryl(meth)acrylate, 2-butoxyethyl(meth)acrylate, 2-ethoxyethoxymethyl(meth)acrylate, 2-ethoxyethyl(meth) acrylate, allyoxymethyl(meth)acrylate, 1-ethoxybuty(meth) acrylate, methoxymethyl(meth)acrylate, 1-ethoxyethyl (meth)acrylate, ethoxymethyl(meth)acrylate; (meth) acrylates of halogenated alcohols, such as 2,3-dibromopropyl (meth)acrylate, 4-bromophenyl(meth)acrylate, 1,3-dichloro-2-propyl(meth)acrylate, 2-bromoethyl(meth)acrylate, 2-iodoethyl(meth)acrylate, chloromethyl(meth)acrylate; oxiranyl(meth)acrylates, such as 10,11-epoxyundecyl(meth) acrylate, 2,3-epoxycyclohexyl(meth)acrylate, 2,3-epoxybutyl(meth)acrylate, 3,4-epoxybutyl(meth)acrylate, glycidyl (meth)acrylate; phosphorus-, boron- and/or silicon-containing (meth)acrylates, such as 2-(dibutylphosphono) ethyl(meth)acrylate, 2,3-butylene(meth)acryloylethylborate, 2-(dimethylphosphato)propyl(meth)acrylate, methyldiethoxy(meth)acryloylethoxysilane, 2-(ethylenephosphito) propyl(meth)acrylate, dimethylphosphinomethyl(meth) acrylate, dimethylphosphonoethyl(meth)acrylate, diethyl (meth)acryloylphosphonate, diethylphosphatoethyl(meth) acrylate, dipropyl(meth)acryoylphosphate; sulphur-containing (meth)acrylates, such as thiomethyl(meth) acrylate, thiocyclohexyl(meth)acrylate, thiophenyl(meth) acrylate, ethylsulfinylethyl(meth)acrylate, 4-thiocyanatobutyl(meth)acrylate, ethylsulfonylethyl(meth) acrylate, thiocyanatomethyl(meth)acrylate, methylsulfinylmethyl(meth)acrylate, bis((meth)acryloyloxyethyl)sulfide; tri(meth)acrylates, such as trimethyloylpropantri(meth)acrylate, glyceroltri(meth)acrylate; tetra(meth)acrylates, such as pentaerythrittetra(meth)acrylate, styrenes, functionalised styrenes, and multiply olefinically unsaturated monomers such as divinyl ether, diallyl phthalate and divinyl benzene. Said compounds can obviously also be used as a mixture of two or more.

When using the mentioned modification A, it is also advantageously possible to include a further monomer following the formation of the organic polymer particles, which can react both with the monomer or the monomers of the polymer and with the reaction diluent. This reaction can be controlled in a targeted manner, because the monomers can be selectively bound to the ends of the respective polymer chains. The use of these further monomers leads to a "capping" (or called "end capping") of the organic polymer particles. The reaction mentioned between the reactive diluent and these "functionalised" and polymerised-in monomers can be controlled and guided. The above-described measures of heating, irradiation etc. can be used here in a suitable and controlled manner.

A further advantageous configuration of the non-aqueous dispersion according to the invention, according to a modification B, consists in that the at least one monomer or the monomers are polymerised to form the polymer particles with the aid of a chain growth mechanism, especially a radical or ionic chain growth mechanism. These are also conventional technical terms, which do not need any further explanation. It is preferred here for at least one monomer or the monomers for forming the polymer particles, to be one or more olefinically mono- or polyunsaturated monomers, the monomers mentioned in the above list A being able to be advantageously used.

The compounds mentioned can obviously be used independently or as a mixture of two or more.

In modification B, it is especially expedient for the reactive diluents to be components of polyurethane resins, epoxy resins, polyamides, polyimides, polyesters, polyureas, polysiloxanes or polyformaldehyde resins. It can easily be ensured with these that they are not included in the polymerisation of the olefinic monomers. Various component combinations are given by way of example in Table 1, with which the above-mentioned polymers can be realised.

It is not necessary for the components necessary to form the above-mentioned polymers to be used together as reactive diluents, but this is also not completely ruled out, however. Thus, for example, either the polyol component or the isocyanate component of a polyurethane to be formed can be used as a reactive diluent and the missing second component can firstly be added after formation of the polymer particles, as indicated in Table 1. The person skilled in the art can easily transfer this procedure to other reactive diluent components.

Combinations of components, such as are given in Table 2, have proven especially advantageous in the scope of the present invention.

If the components are used in the corresponding mixture, the person skilled in the art has to take care that the polymerisation of the reactive diluent cannot proceed spontaneously. This can, for example, be ensured in that a catalyst or initiator is only added after the formation of the polymer particles. Measures such as this and equivalent ones to control the reaction are obviously familiar to the person skilled in the art.

In the scope of the invention it is not necessary to critically restrict the mean diameter of the polymer particles. It is easily possible for the person skilled in the art when producing this non-aqueous dispersion, to adjust such conditions, especially in stirred tank reactors, with which the mean diameter can be adjusted in the desired manner without problems. It is generally advantageous if the polymer particles of the non-aqueous dispersion according to the invention have a mean diameter of less than 50 µm. Furthermore, it is preferred if the mean diameter of the polymer particles is less than 10 µm, especially less than 250 nm. A diameter of less than 40 nm is especially advantageous if transparency is aimed for the non-aqueous dispersion. The diameters given can, especially if they are in the colloidal range, be determined by means of light scattering. The invention also provides an advantageous control or flexibility here in the adjustment of the advantageous mean diameter of the polymer particles in view of the application.

The person skilled in the art will also adjust the concentration of the organic polymer particles in the non-aqueous dispersion according to the invention as desired according to the requirements of the respective use. It can be given as an advantageous rule that the polymer particles in the non-aqueous dispersion are expediently present in a quantity of 20 to 70% by weight. The range of 30 to 60% by weight is especially preferred. A non-aqueous dispersion in the plurality of use possibilities is quite especially advantageous if the content of polymer particles is between 40 and 50% by weight.

The invention also allows the possibility of an advantageous configuration if additives are additionally included. It is especially advantageous here for the non-aqueous dispersion to contain additives from the group consisting of accelerators, antioxidants, polymerisation initiators for the reactive diluent, polymeric and oligomeric binders, wetting agents, colouring and/or effect-providing agents, organic and inorganic, transparent or opaque fillers, UV-absorbers, light protection agents, degassing agents, defoamers, emulsifiers, wetting and dispersants, adhesion promoters, rheology-controlling additives, flame retardants, drying agents, corrosion inhibitors, waxes and matting agents, stabilisers or mixtures thereof. In general, no stabiliser for stabilising the particles in the liquid phase has to be added to the non-aqueous dispersion according to the invention. However, if one or more stabilisers are added, those of the kind considered by the person skilled in the art in general for stabilising dispersions of the described type can be used, especially dimethylolpropionic acid and esters thereof, phase promoters based on ethylene glycol and 2-amino-2-methylpropanol or salts, amides and esters of higher fatty acids, the salts, amides and esters of which are optionally modified with functionalities, which allow incorporation into the matrix of the polymer particles.

Moreover, even if obviously not imperative, the possibility exists of using solvents, if they do not counteract the technological basic idea according to the invention, as described above. In any case, they have to be inert. Examples which can be given are: hydrocarbons, ethers, esters, ketones and/or halogen hydrocarbons, especially pentane, hexane, cyclohexane, petroleum ether, toluene, benzene, THF, diethyl ether, acetic acid ethyl ester, acetone, methyl ethyl ketone, chloroform, methylene chloride, carbon tetrachloride.

On the one hand, these can encourage the desired formation of organic polymer particles and, on the other hand, also be advantageous in the various possible applications. Thus, the viscosity of the non-aqueous dispersion according to the invention can be advantageously matched to the respective purpose of use. A low viscosity is advantageous if the materials have to be pumped through narrow nozzles or pipelines or poured into narrow pores or cavities. When using adhesives or two-component resins, a viscosity adaptation is optionally also required in order to make the resins for surfaces wettable or to allow the mixability thereof in static mixers.

The general teaching according to the invention, as shown above and claimed in the following claim 1 does not emerge directly and unambiguously from the prior art described at the outset. Nevertheless, the latter is obviously not to be a component of the present invention, the latter in its various configurations, i.e. in its configuration as a non-aqueous dispersion, and also not in the configuration of the method described below and the use possibilities described below. Consequently to be excluded is a non-aqueous transparent dispersion of polyurethane(meth)acrylate particles in a reactive diluent, these particles having a mean diameter of less than 40 nm and the particles additionally being converted with a nucleophilically functionalised (meth)acrylic acid ester. Likewise, non-aqueous transparent dispersions, which contain the polyurethane(meth)acrylate particles with a mean diameter of less than 40 nm and a reactive diluent, in which additionally a nucleophilically functionalised (meth)acrylic acid ester is present in the reactive diluent, are not to be a component of the present invention.

As already stated above, with respect to the non-aqueous dispersion according to the invention, there is no relevant restriction to the type of organic polymer particles contained or formed therein: polyamides composed of carboxylic acids and amines, epoxy resins composed of epoxides and diamines or diacids, urea and melamine resins of urea derivatives and aldehydes, phenolic resins composed of phenols and aldehydes, polyolefins composed of individual olefins, silicone resins composed of ethyl polysilicates and disiloxanes, polycarbonates composed of phosgene and diols, polyaryletherketones composed of dialkoxyaryl derivates and aryl diols, polyamides composed of amines and carboxylic acid derivates and polyphenylene sulphides composed of 1,4-dichlorobenzene and sodium sulphide. Reference is emphatically made to the fact that this listing is not exhaustive. Rather the person skilled in the art can easily see that diverse other polymeric materials can also be considered.

Furthermore, a method for producing a non-aqueous dispersion of organic polymer particles of the above described type according to the invention, as also shown in claims 1 to 15, is the subject of the present invention to solve the aim posed, this method comprising a polymerisation into the organic polymer particles of at least one monomer in a stirred tank reactor in the presence of the already described reactive diluent. This method is, especially, characterised in that the conversion is carried out at a peripheral stirrer speed of at least 2 m/s, the ratio of stirrer diameter to vessel diameter being adjusted to 0.3 to 0.80 and the distance of the stirrer from the vessel base being adjusted to 0.25 to 0.5 times the stirrer diameter.

It is expedient and advantageous here for the peripheral stirrer speed to be adjusted to at least 5 m/s, especially to at least 8 m/s. It can clearly be seen by the person skilled in the art from the above description that the peripheral stirrer speed has a significant influence on the particle size of the polymer particles being produced. The person skilled in the art is therefore easily in a position to adjust the peripheral stirrer speed such that the desired particle size is obtained. In the practical realisation of the method according to the invention, it has also been shown that it is advantageous if a dispersing disc is used as the stirrer.

It was already pointed out above in conjunction with the non-aqueous dispersion according to the invention that various additives can be included. To avoid repetitions reference is made to the statements above in this regard. In this case, these additives can be used both during the conduct of the method and also on completion of the method, depending on the functionality. However, it is advantageous for the method according to the invention to be carried out in the presence of a catalyst or reaction initiator suitable for the polymerisation of the particle-forming monomers. Depending on the reaction mechanism, acids, bases, tertiary aromatic amines or metallic soaps, for example, can be used as catalysts and peroxides, azo compounds or benzoin ethers can be disclosed, for example, as reaction initiators.

The value of the present invention proves to be, especially, in the flexible practical realisation of a large number of application possibilities. This flexibility, especially, is attributable to the type of organic polymer particles included, but also the reactive diluents used in combination therewith. The person skilled in the art then has diverse possibilities here for further control by means of, for example, suitable introduction of temperature, and/or by additional introduction of additives in the desired type or functionality.

A particular advantage of the non-aqueous dispersion according to the invention comprises in that they can be used as impact strength modifiers, especially in films. These films may, for example, be polyamides, polyvinyl acetates, polyester, polyvinylidene chloride, or PVC.

Moreover, the dispersion according to the invention can also be hardened directly to form an adhesive compound or a cast body. Apart from a hardening initiator, no further substances need to be added. However, it is also possible to mix the dispersion according to the invention with conventional adhesive systems or casting compounds and to then harden the mixture.

Dispersions hardened into moulded bodies according to the present invention, owing to the organic polymer particles contained therein, depending on the type, have the desirable application properties, for example, in the individual case, excellent impact strength properties and valuable other mechanical properties, especially a high tensile strength.

Because of the advantageous impact strength and tensile strength mentioned of the non-aqueous dispersions according to the invention, they are excellently suited for adhesive applications, which can even be realised by a correspondingly low adjustment of the mean particle diameter with a high transparency. Thus, the dispersion according to the invention can advantageously be used as an adhesive for glass. Owing to the transparency adjusted in a controlled manner and the excellent impact strength, the dispersion according to the invention is also suitable as a casting compound to produce transparent, impact-resistant products. It is also advantageous that the dispersion according to the invention is stable over a relatively long time, for example at least two months, at room temperature and therefore can be stored for a desirably long time. It also proves to be advantageous that the dispersion according to the invention can have a high solid content, i.e. in particular of the organic polymer particles.

In general, the non-aqueous dispersion according to the invention also has the suitable viscosity for various applications. However, in the individual case, it may be expedient, in order to reduce the viscosity, to already use a suitable solvent before the application or else in the course of the production method according to the invention.

Further advantageous use possibilities of the non-aqueous dispersion of the present invention are given together with the polymer particles and reactive diluents used for this in the following Table 3.

The invention will be described in more detail below with the aid of various examples, which are not, however, to be regarded as restrictive in any way.

Production of Poly Ethylhexyl Acrylate Polymer Particles in Various Media

Example 1

Production of 2-Ethylhexyl Acrylate Particles in a Polyurethane Matrix 0.076 mol (150 g) reactive diluent polyether polyol ($M_w$=1965 g/mol) and 0.54 mol (100 g) 2-ethylhexyl acrylate (M=184.3 g/mol) are weighed on a top-loading balance. The mixture is heated while stirring to 90° C. (2 m/s). 0.003 mol azo-bis-(isobutyronitrile) (AIBN, 0.5 g (0.5% by weight) dissolved in 10 ml 2-ethylhexyl acrylate) is then added. The polymerisation takes place at 90° C. while stirring (2 m/s) for 3 h. A solution with a solid content of 40% is obtained. 5 g of the dispersion are then heated with 0.0015 mol diphenylmethane-4,4'-diisocyanate (MDI) (0.38 g, M=250.25 g/mol) while adding the catalyst dibutyltin laurate (DBTDL, 0.02 g, M=631.55 g/mol) to 60° C. in order to polymerise the polyether polyol with the isocyanate (mol ratio polyol:isocyanate 1:1) into polyurethane.

Example 2

Production of 2-Ethylhexyl Acrylate Particles Using Dodecyl Mercaptan as the Chain Regulator in a Polyurethane Matrix 0.076 mol (150 g) reactive diluent polyether polyol ($M_W$=1965 g/mol) and 0.54 mol (100 g) 2-ethylhexyl acrylate (M=184.3 g/mol) are weighed on a top-loading balance. The mixture is heated while stirring to 90° C. (2 m/s). 0.003 mol azo-bis-(isobutyronitrile) (AIBN, 0.5 g (0.5% by weight) dissolved in ml 2-ethylhexyl acrylate) are then added. 1% dodecyl mercaptan (M=202.4 g/mol) are added to the reaction as the chain regulator. The polymerisation takes place at 90° C. while stirring (2 m/s) for 3 h. 5 g of the dispersion are then heated with 0.0015 mol diphenylmethane-4,4'-diisocyanate (MDI) (0.38 g, M=250.25 g/mol) with the addition of the catalyst dibutyltin laurate (DBTDL, M=631.55 g/mol) to 60° C. in order to polymerise the polyether polyol with the isocyanate (mol ratio polyol:isocyanate 1:1) into polyurethane.

Example 3

Production of 2-Ethylhexyl Acrylate Particles Using 12-Hydroxystearic Acid as the Stabiliser in a Polyurethane Matrix 0.076 mol (150 g) reactive diluent polyether polyol ($M_W$=1965 g/mol) and 0.54 mol (100 g) 2-ethylhexyl acrylate (M=184.3 g/mol) are weighed on a top-loading balance. The mixture is heated while stirring to 90° C. (2 m/s). 0.003 mol azo-bis-(isobutyronitrile) (AIBN, 0.5 g (0.5% by weight) dissolved in 10 ml 2-ethylhexyl acrylate) is then added. 0.5% 12-hydroxystearic acid is added to the reaction as a stabiliser. The polymerisation takes place at 90° C. while stirring (2 m/s) for 3 h. 5 g of the dispersion are then heated with 0.0015 mol diphenylmethan-4,4'-diisocyanate (MDI) (0.38 g, M=250.25 g/mol) with the addition of the catalyst dibutyltin laurate (DBTDL, M=631.55 g/mol) to 60° C. in order to polymerise the polyether polyol with the isocyanate (mol ratio polyol: isocyanate 1:1) into polyurethane.

Example 4

Production of 2-Ethylhexyl Acrylate Particles in a Polyurea Matrix 0.076 mol (150 g) reactive diluent (hexamethylenediamine) (M=116.21 g/mol) and 0.54 mol (100 g) 2-ethylhexyl acrylate (M=184.3 g/mol) are weighed on a top-loading balance. The mixture is heated while stirring to 90° C. (2 m/s). 0.003 mol azo-bis-(isobutyronitrile) (AIBN, 0.5 g (0.5% by weight) dissolved in 10 ml 2-ethylhexyl acrylate) is then added. The polymerisation takes place at 90° C. while stirring (2 m/s) for 3 h. 5 g of the dispersion are then heated with 0.0015 mol diphenylmethane-4,4'-diisocyanate (MDI) (0.38 g, M=250.25 g/mol) with the addition of the catalyst dibutyltin laurate (DBTDL, M=631.55 g/mol) to 60° C. in order to polymerise the hexamethylenediamine with the isocyanate (mol ratio diamine:isocyanate 1:1) into polyurea.

Example 5

Production of 2-Ethylhexyl Acrylate Particles in a Polyamide Matrix 0.076 mol (150 g) reactive diluent hexamethylenediamine (M=116.21 g/mol) and 0.54 mol (100 g) 2-ethylhexyl acrylate (M=184.3 g/mol) are weighed on a top-loading balance. The mixture is heated while stirring to 90° C. (2 m/s). 0.003 mol azo-bis-(isobutyronitrile) (AIBN, 0.5 g (0.5% by weight) dissolved in 10 ml 2-ethylhexyl acrylate) is then added. The polymerisation takes place at 90° C. while stirring (2 m/s) for 3 h. The dispersion is then heated with 0.076 mol azelaic acid (M=188.22 g/mol) with the addition of the catalyst p-toluenesulfonic acid (M=172.20 g/mol) to 130° C. in order to polymerise the hexamethylenediamine with the acid into polyamide.

Example 6

Production of 2-Ethylhexyl Acrylate Particles in a Polyester Matrix 0.076 mol (150 g) reactive diluent polyether polyol ($M_W$=1965 g/mol) and 0.54 mol (100 g) 2-ethylhexyl acrylate (M=184.3 g/mol) are weighed on a top-loading balance. The mixture is heated while stirring to 90° C. (2 m/s). 0.003 mol azo-bis-(isobutyronitrile) (AIBN, 0.5 g (0.5 g (0.5% by weight) dissolved in 10 ml 2-ethylhexyl acrylate) is added. The polymerisation takes place at 90° C. while stirring (2 m/s) for 3 h. The dispersion is then heated with 0.076 mol azelaic acid (M=188.22 g/mol) with the addition of p-toluenesulfonic acid (M=172.20 g/mol) to 130° C. in order to polymerise the polyether polyol with the azelaic acid into polyester.

TABLE 1

Examples of polymer types

| (1) Reactive diluent | (2) Monomer (for reactive diluent) | Polymer (of (1) and (2)) |
| --- | --- | --- |
| diamine | dianhydride | polyimide |
| diamine | diisocyanate | polyurea |
| diamine | dicarboxylic acid | polyamide |
| polyalcohol/diol | dicarboxylic acid | polyester |
| unsaturated polyester resin | — | polyester |
| polyalcohol/diol | diisocyanate | polyurethane |
| styrene | — | polystyrene |
| (meth)acrylate | — | poly(meth)acrylate |
| phenol | formaldehyde | phenolic resin |
| furan | formaldehyde | furan resin |
| melamine | formaldehyde | melamine formaldehyde resin |
| urea | formaldehyde | urea formaldehyde resin |

TABLE 3

Application examples for polymer particles/reactive diluent, combinations

| Polymer particles based on | Reactive diluent | Matrix polymer | Application example |
|---|---|---|---|
| poly(meth)acrylates, polystyrenes | diamines | polyimide | films (electrotechnology), insulation means |
| poly(meth)acrylates, polystyrenes | diamines | polyurea | coatings, adhesives, foams |
| poly(meth)acrylates, polystyrenes | diamines | polyamide | polyamide resins, fibres, moulding compounds |
| poly(meth)acrylates, polystyrenes | polyalcohol/ diol | polyester | paints, moulding compounds |
| poly(meth)acrylates, polystyrenes | unsaturated polyester resin | polyester | dyes, casting resins |
| poly(meth)acrylates, polystyrenes | polyalcohol/ diol | polyurethane | coatings, adhesives, foams (automotive industry) |
| polyurethanes | styrene | polystyrene | foams, films |
| polyurethanes | (meth)acrylates | poly(meth)-acrylate | paints, adhesives |
| poly(meth)acrylates, polystyrenes | phenol | phenolic resin | fillers, hard foam panels |
| poly(meth)acrylates, polystyrenes | furan | furan resin | moulding materials |

TABLE 2

Exemplary reactions for polymer types

| (1) Reactive diluent | (2) Monomer (for reactive diluent) | Polymer (of (1) and (2)) |
|---|---|---|
| isophorone diamine | pyromellitic acid dianhydride | polyimide |
| ethylene diamine | 3,3',4,4'-benzophenone tetracarboxylic dianhydride | polyimide |
| hexamethylene diamine | Diethylenetriamine pentaacetic acid dianhydride | polyimide |
| isophorone diamine | isophorone diisocyanate | polyurea |
| ethylene diamine | 2,4,4-trimethylhexamethylene diisocyanate | polyurea |
| hexamethylene diamine | hexamethylene diisocyanate | polyurea |
| isophorone diamine | adipic acid | polyamide |
| ethylene diamine | sebacic acid | polyamide |
| hexamethylene diamine | azelaic acid | polyamide |
| ethylene glycol | adipic acid | polyester |
| 1,2-propanediol | sebacic acid | polyester |
| 1,4-butanediol | azelaic acid | polyester |
| unsaturated polyester resin | — | polyester |
| polyether polyols | isophorone diisocyanate | polyurethane |
| organo-functionalised polysiloxanes | 2,4,4-trimethylhexamethylene diisocyanate | polyurethane |
| copolyester polyols | hexamethylene diisocyanate | polyurethane |
| styrene | — | polystyrene |
| (meth) acrylates | — | poly(meth)acrylate |
| 3,5-dimethyloxyphenol | formaldehyde | phenolic resin |
| phenol | formaldehyde | phenolic resin |
| m-tert. butylphenol | formaldehyde | phenolic resin |
| 3,5-dimethylphenol | formaldehyde | phenolic resin |
| o-cresol | formaldehyde | phenolic resin |
| m-cresol | formaldehyde | phenolic resin |
| p-cresol | formaldehyde | phenolic resin |
| furan | formaldehyde | furan resin |
| furfural | formaldehyde | furan resin |
| furfural alcohol | formaldehyde | furan resin |

The invention claimed is:

1. A non-aqueous dispersion of organic polymer particles in a reactive diluent in the form of components of epoxy resins, polyamides, polyimides, polyureas, polysiloxanes or polyformaldehyde resins, the non-aqueous dispersion of organic polymer particles in a reactive diluent obtained by at least one monomer being polymerized in the reactive diluent, forming the organic polymer particles, wherein the reactive diluent does not participate in this polymerisation due to its orthogonal reactivity relative to the monomers, but has a functionality allowing a later targeted polymerisation, characterized in that the at least one monomer has been polymerized to form the organic polymer particles with the aid of a chain growth mechanism.

2. The non-aqueous dispersion according to claim 1, characterized in that the at least one monomer to form the organic polymer particles is or are one or more olefinically unsaturated monomers.

3. The non-aqueous dispersion according to claim 1 characterized in that the organic polymer particles have a mean diameter of less than 50 μm.

4. The non-aqueous dispersion according to claim 3, characterized in that the organic polymer particles have a mean diameter of less than 10 μm.

5. The non-aqueous dispersion according to claim 1, characterized in that the organic polymer particles are present therein in a quantity of 20 to 70 percent by weight.

6. The non-aqueous dispersion according to claim 5, characterized in that the organic polymer particles are present therein in a quantity of 30 to 60 percent by weight.

7. The non-aqueous dispersion according to claim 6, characterized in that the dispersion additionally contains additives.

8. The non-aqueous dispersion according to claim 7, characterized in that the dispersion contains additives from the group consisting of accelerators, antioxidants, polymerisation initiators for the reactive diluent, polymeric and oligomeric binders, cross-linking agents, colouring and/or effect-providing agents, organic and inorganic, transparent or opaque fillers, UV absorbers, light protection agents, degassing agents, defoamers, emulsifiers, wetting agents and dispersants, adhesion promoters, rheology-controlling additives, flame retardants, drying agents, corrosion inhibitors, waxes and matting agents, stabilisers, and mixtures thereof.

9. A method for producing a non-aqueous dispersion of organic polymer particles according to claim 1, comprising the polymerisation of at least one monomer in a stirred tank reactor in the presence of a reactive diluent, characterized in that the conversion is carried out at a peripheral stirrer speed of 2 m/s to 8 m/s, the ratio of the stirrer diameter to vessel diameter being adjusted to 0.3 to 0.80 and the distance of the stirrer from the vessel base being adjusted to 0.25 to 0.5 times the stirrer diameter.

10. The method according to claim 9, characterized in that the peripheral stirrer speed is adjusted to a value of 2 m/s to 5 m/s.

11. The method according to claim 10, characterized in that a dispersing disc is used as the stirrer.

12. The method according to claim 11, characterized in that the method is carried out in the presence of a catalyst or reaction initiator suitable for the polymerisation of the particle-forming monomers.

13. A non-aqueous dispersion according to claim 1, characterized in that the at least one monomer has been polymerized with the aid of a radical or ionic chain growth mechanism.

14. A non-aqueous dispersion according to claim 4, characterized in that the polymer particles have a mean diameter of less than 250 nm.

15. A non-aqueous dispersion according to claim 6, characterised in that the organic polymer particles are present therein in a quantity of from 40 to 50 percent by weight.

* * * * *